United States Patent [19]

Chang et al.

[11] Patent Number: 5,274,713
[45] Date of Patent: Dec. 28, 1993

[54] REAL-TIME APPARATUS FOR DETECTING SURFACE DEFECTS ON OBJECTS

[75] Inventors: Han-Chieh Chang; Ting-Yao Chen; Hsien-Yei Chen, all of Hsinchu Hsien, Taiwan

[73] Assignee: Industrial Technology Research Institute, Hsinchu Hsien, Taiwan

[21] Appl. No.: 764,221

[22] Filed: Sep. 23, 1991

[51] Int. Cl.$^5$ .................. G06K 9/00; H04N 7/18
[52] U.S. Cl. .................. 382/8; 250/563; 250/572; 356/237; 358/106
[58] Field of Search .......... 382/8; 358/106, 107, 358/101; 356/237; 364/474.16, 507; 250/563, 572

[56] References Cited

U.S. PATENT DOCUMENTS

| | | | |
|---|---|---|---|
| 4,758,782 | 7/1988 | Kobayashi | 382/8 |
| 4,811,410 | 3/1989 | Amir et al. | 382/8 |
| 4,975,972 | 12/1990 | Bose et al. | 382/8 |
| 5,137,362 | 8/1992 | Le Beau | 382/8 |

*Primary Examiner*—Leo H. Boudreau
*Attorney, Agent, or Firm*—Bacon & Thomas

[57] ABSTRACT

A real-time apparatus for detecting surface defects on a moving object under test comprises a high-frequency linear light source for generating linear light which is focused on a line position of the tested object, a linear CCD (charge coupled device) camera for scanning the line position and generating an image signal, an image-signal processing device for converting the analog image signal to digital image signal and further converting the digital signal to a HIGH or a LOW signal, a combination of the HIGH and LOW signals constituting constituting binary image data in the form of binary pulses, an image-storing circuit connected to the image-signal processing circuit for storing the binary image data, a defect-detecting unit for detecting if an area unit has a valid defect which meets one of a set of predetermined defect patterns or detecting statistical defects which are not valid defects but a plurality of small defects combined together still counted as defects, and a defect detecting statistic unit connected to the image-storing circuit for calculating a total amount of defect, and the area and location of each defect by a well-known connectivity analyzation process.

5 Claims, 10 Drawing Sheets

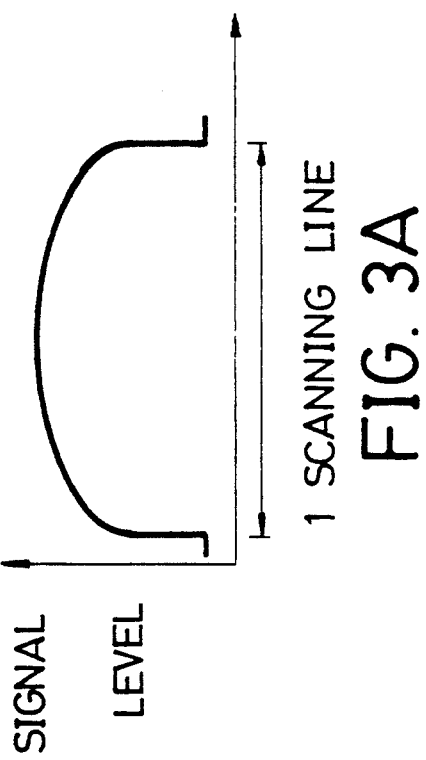
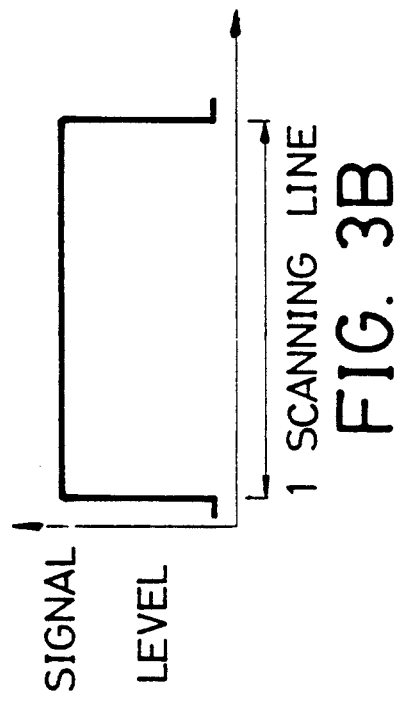

VALID DEFECT = $Q_3Q_2Q_1 + Q_4Q_3Q_2 + Q_5Q_3Q_1 + Q_6Q_2Q_1$ $+ Q_7Q_4Q_1 + Q_7Q_4Q_2 + Q_7Q_5Q_1 + Q_7Q_5Q_3$ $+ Q_8Q_4Q_1 + Q_2Q_5Q_7 + Q_3Q_5Q_4 + Q_9Q_5Q_1$ $+ Q_2Q_4Q_8 + Q_1Q_5Q_8 + Q_2Q_4Q_6 + Q_1Q_5Q_6$

REAL-TIME APPARATUS FOR DETECTING SURFACE DEFECTS ON OBJECTS

BACKGROUND OF THE INVENTION

The present invention relates to a real-time apparatus for detecting surface defects on objects.

The most traditional way for detecting surface defects of objects is by human visual inspection, which has the following drawbacks:

(1) the human eye is limited to detecting stationary objects, not quickly moving objects; and (2) the human eye easily tires, lowering the efficiency thereof.

Another conventional way of detecting surface defects is to utilize arrays of photosensors to test an object and to detect the surface defects thereof. The drawback of photosensors arises from the large amounts of photosensors which causes difficulty in implementation and which generates a faulty result if anyone of the photosensors malfunctions.

Another technique to accomplish surface-defect detection may utilize a laser detecting device. However, the speed of an object under test is limited under 1.2 m/s, if it is tested with a conventional laser detecting device. A drawback for a real-time detecting laser device is that it costs too much to be readily affordable in this field.

SUMMARY OF THE INVENTION

The invention refers to a real-time apparatus for detecting surface defects on objects comprising a high-frequency linear light source for generating linear light which is focused on a line position of the tested object, a linear CCD (charge coupled device) camera for scanning the line position and generating an analog image signal, an image-signal processing device for converting the analog image signal to digital image signal which is a 256-level gray signal, and further converting the digital signal to a HIGH or a LOW signal depending on a predetermined threshold of the gray scale of the digital image signal, a combination of the HIGH and LOW signals constituting binary image data in the form of binary pulses, an image-storing circuit connected to the image-signal processing circuit for storing the binary image data, a defect-detecting unit for detecting if an area unit has a valid defect which meets one of a set of predetermined defect patterns or detecting statistical defects which are not valid defects but a plurality of small defects combined together still counted as defects, and a defect detecting statistic unit connected to the image-storing circuit for calculating a total amount of defect, and the area and location of each defect by a well-known connectivity analyzation process.

The primary object of the present invention is to provide a real-time apparatus for detecting surface defects on objects to replace a traditional human-eyed detecting, photosensor detecting, or laser detecting.

Another object of the present invention is to provide a real-time apparatus for detecting a surface "valid defect" which has an area unit meeting with one of a set of predetermined patterns.

Another object of the present invention is to provide a real-time apparatus for detecting surface defects which pas in the previous detecting stage in an area unit but together are still counted as defects if the amount of the small defects in a predetermined area, such as an area equals to 30 scanning lines, exceeds a predetermined value.

Another object of the present invention is to provide a real-time apparatus which automatically detects the surface defects on a tested object with high speed and has statistic analyzation.

Another object or the present invention is to provide a real-time apparatus having a linear detecting mode for checking a moving object.

Another object of the present invention is to provide a real-time apparatus having a high-frequency linear light source (at least 25 KHz) to generate linear light for operating in a linear detecting mode.

Another object of the present invention is to provide a real-time apparatus having an illumination compensation table to equalize linear light.

Another object of the present invention is to provide a real-time apparatus having connectivity analyzation ability to calculate the amount of defects, the area of each defect spot, and the location of each defect spot.

Further objects and advantages of the present invention will become apparent from a careful reading of the detailed description provided hereinbelow, with appropriate reference to the accompanying drawings.

BRIEF DESCRIPTION OF THE DRAWINGS

FIG. 3A is a schematic view showing a distortion effect at two sides of a scanning line;

FIG. 3B is a schematic view showing a-compensation effect on the scanning line of FIG. 3A.

DETAILED DESCRIPTION OF THE INVENTION

Figure 1:
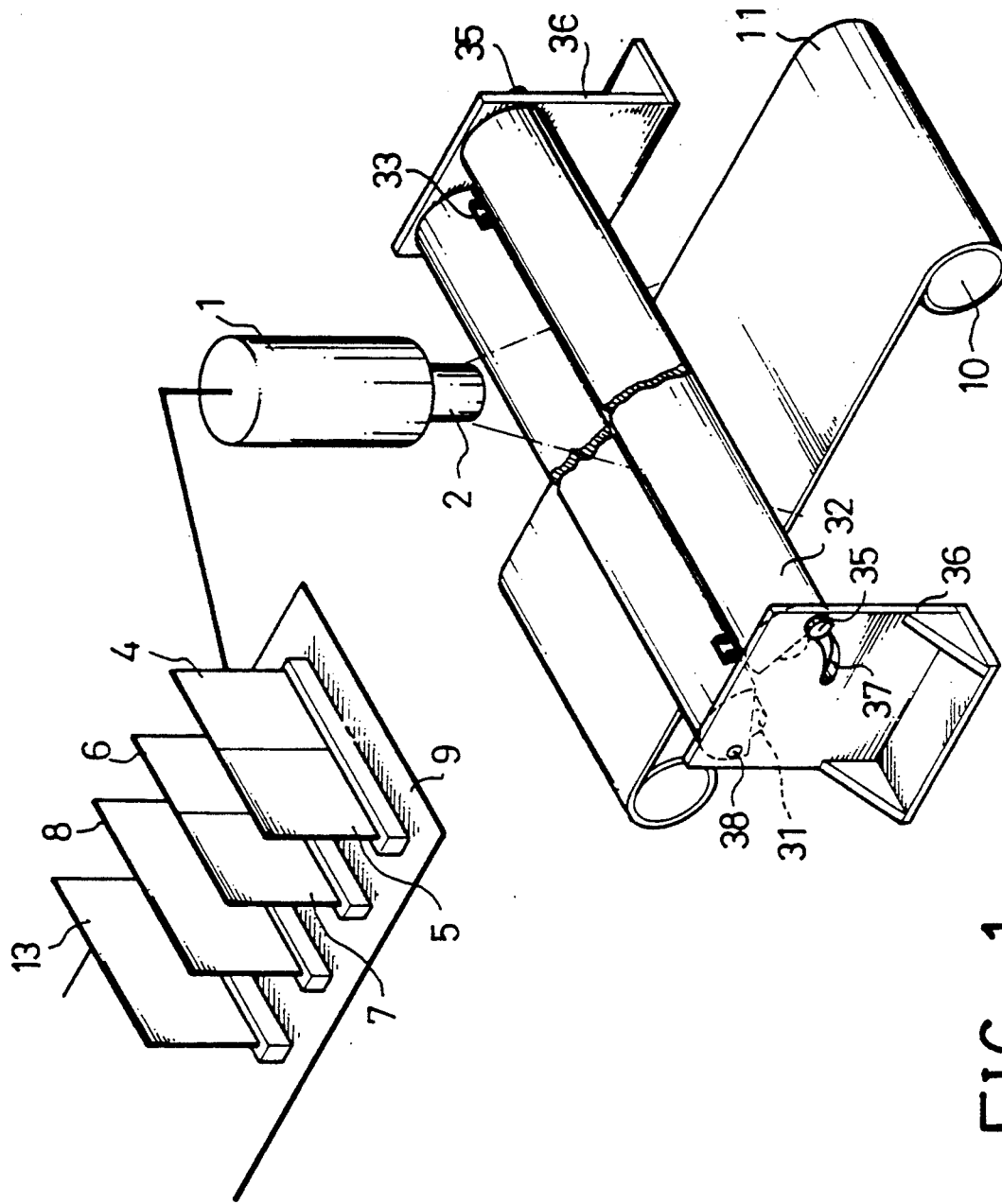
FIG. 1 is an perspective view of a preferred embodiment according to the present invention.

Referring to FIG. 1, a real-time detecting apparatus in the present invention comprises a linear CCD (charge coupled device) camera 1, a lens 2, a high-frequency linear light source (at least 25 KHz) 3, a driving circuit 4 for the linear CCD camera, an image-signal processing circuit 5, an image-storing circuit 6, a defect-detecting circuit 7, a statistical-defect detecting circuit 8, a signal bus main board 9, and a defect-detecting statistic unit 13. An object under test 11 (hereinafter shortened as OUT) is located on a simplified conveying device 10 and is moved continuously thereby. The conveying device 10 is not in the scope of the present invention and needs not be described in detail.

Figure 4C:
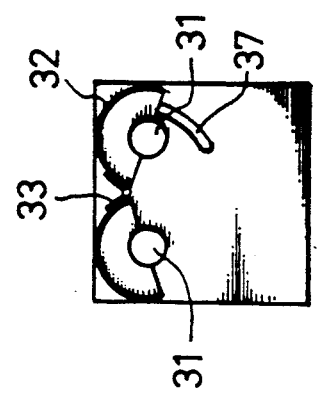
FIG. 4C is a sectional view cut from FIG. 4A.
Figure 4D:
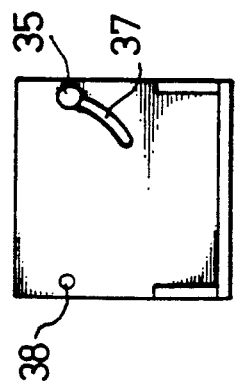
FIG. 4D is a side view of a high-frequency linear light source of the present invention.
Figure 4A:
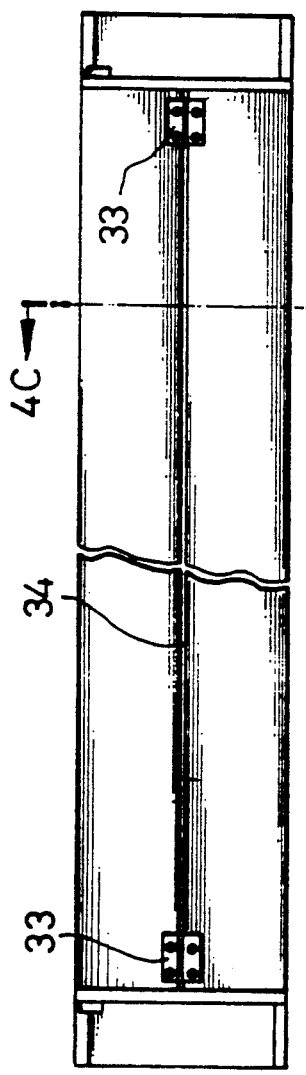
FIG. 4A is a top view of a high-frequency linear light source of the present invention.
Figure 4B:
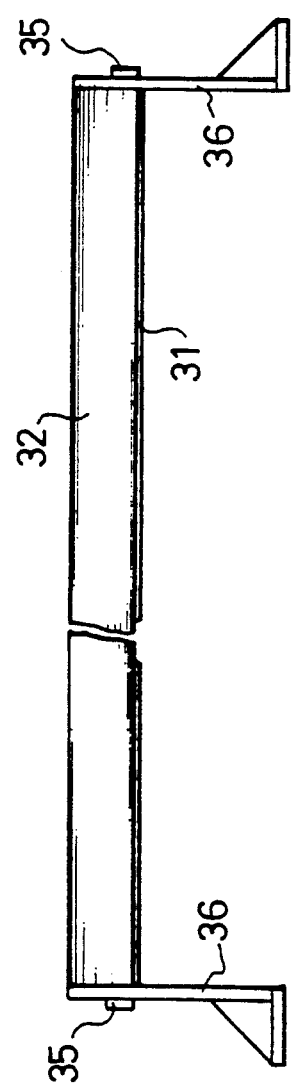
FIG. 4B is a front view of a high-frequency linear light source of the present invention.
Figure 4E:
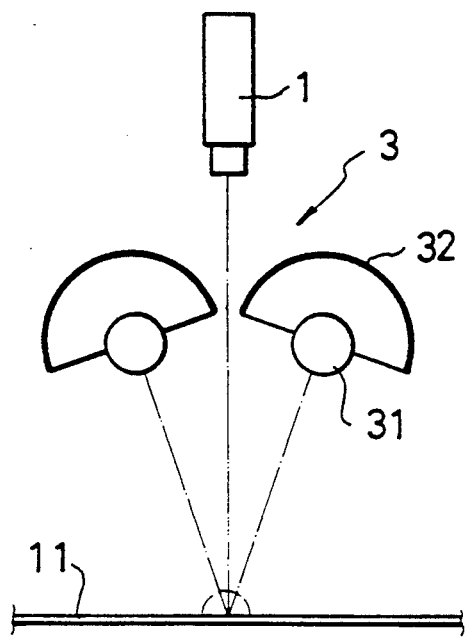
FIG. 4E is a schematic view showing the high-frequency linear light source incorporating with a linear CCD camera.

FIGS. 4A, 4B, 4C, and 4D shows the high-frequency linear light source 3 used in the present invention. The high-frequency linear light source 3 comprises two fluorescent lighting tubes 31 each with a semicircular light shield 32 supported by a pair of supporting means 36 on longitudinal sides thereof. Two hinges 33 are connected between the two light shields 32. A gap 34 is formed between the two light shields 32 which is used as a channel for the light reflected from the surface of OUT 11 to the linear CCD camera 1. The width of the gap 34 remains constant because of the geometry of the light shields 32 (semicircular) and the engagement of the hinges 33 therewith. One light shield 32 is engaged to the pair of supporting means 36 with a pair of secured points 38 thereon. Two knobs 35 are fixed to two longitudinal ends of the other light shield 32, with two guiding grooves 37 formed on each supporting means 36, respectively, such that a user can adjust a focusing angle of the light source 3 by lifting up or pulling down the knobs 35 along the guiding grooves 37, and "lock" the knobs 35 when the focusing angle has been adjusted. It should be noted that the two guiding grooves 37 are formed such that when the knobs 35 are lifted up or pulled down along the guiding grooves 37, the focusing angle between the light shields 32 are changed respondingly. Therefore, the light source 3 is employable in different distances of OUT. FIG. 4E shows the sectional view of the high-frequency linear light source 3 incorporated with the linear CCD camera 1.

Figure 2:
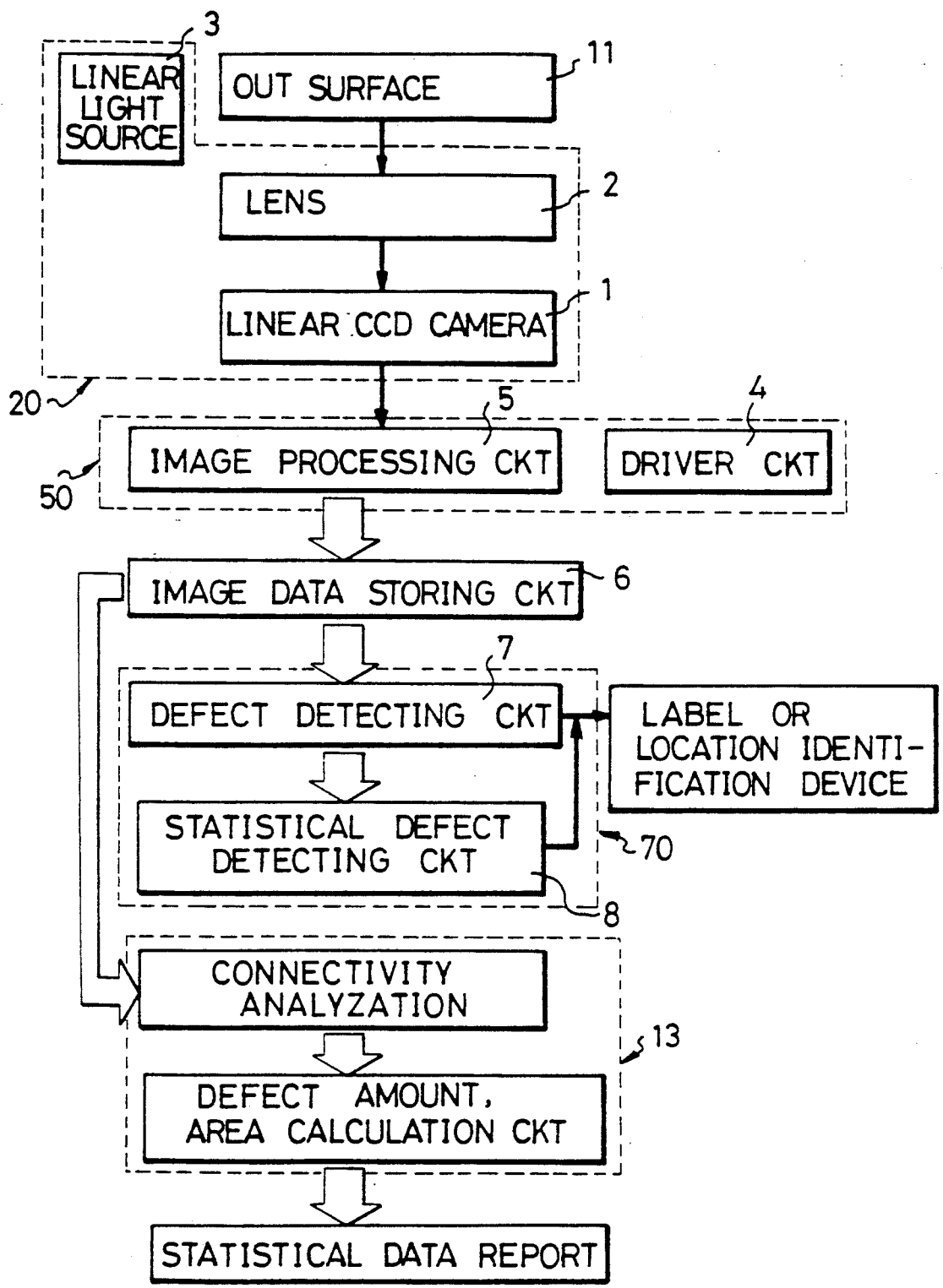
FIG. 2 is a block diagram of the present invention.
Figure 5:
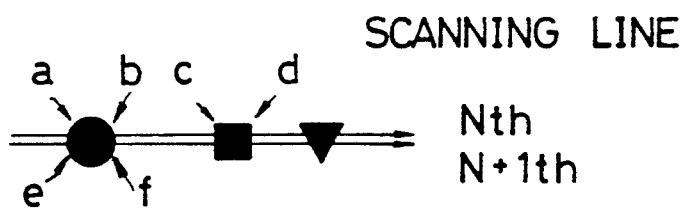
FIG. 5 is a schematic representation of scanning process of a linear CCD camera to different defect patterns.

Referring to FIGS. 2 and 5, the high-frequency linear light source 3 generates a linear light which is focused on the surface of the OUT 11. The linear CCD camera 1 picks up the reflected light from the OUT 11 through the lens 2 disposed thereon, and generates image signals which represent a scanning line. As the OUT 11 moves, the linear CCD camera 1 scans the OUT 11 line-by-line. The technical details for processing the reflection light to image signal is a known skill not included in the scope of the present invention.

The driving circuit 4 for the linear CCD camera 1 controls the image signal to couple with the image-signal processing circuit 5.

Figure 3:
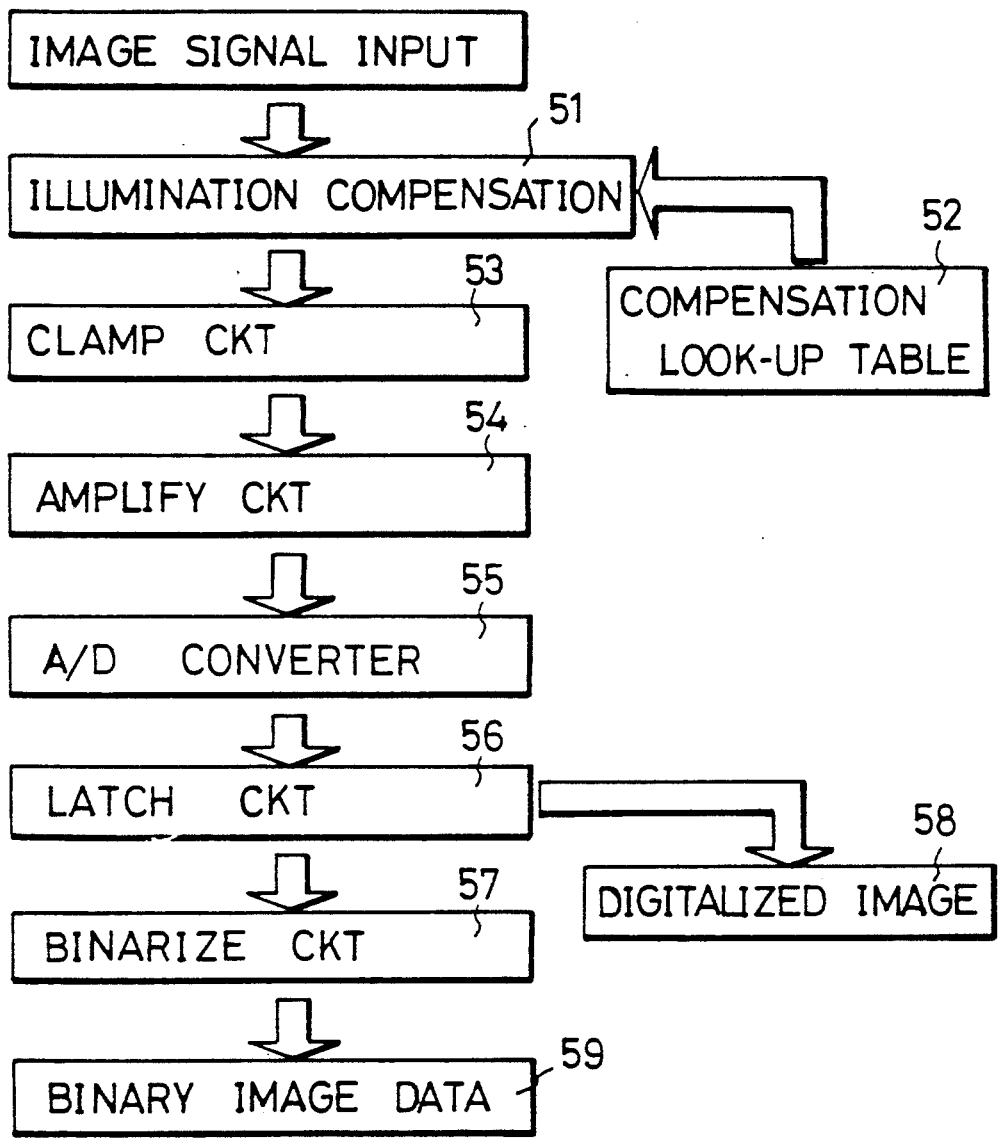
FIG. 3 is a block diagram of an image signal processing unit of the present invention.

Referring to FIG. 3, the image signal from the linear CCD camera 1 is coupled with an illumination compensation circuit 51 which acquires a plurality of compensation factors from a compensation table 52, thereby compensating for the light deviation problem in linear light. It is known that the signal level on the two sides of a scanning line is distorted (see FIG. 3A) and should be compensated as an original scanning line (see FIG. 3B). The compensation table 52 is implemented as a hardware construction and is installed in the driving circuit 4.

After the compensation from the illumination compensation circuit 51, a compensated image signal thereof is coupled through a clamp circuit 53 and an amplifier circuit 54 to an A/D (analog to digital) converter 55. The A/D converter 55 digitalizes the compensated and amplified image signal to a 256-level digitalized image signal which is represented by an 8-bit digital signal. The digital image signal is leveled from degree 0 to degree 255, according to its gray scale level. The digital image signal is coupled through a latch circuit 56 to a binary circuit 57. The binary circuit determines a digital image signal to be either a HIGH (i.e. "1" in Boolean algebra) signal or a LOW (i.e. "0" in Boolean algebra) signal as in binary digital signal. For example, if the gray scale level of the digital image signal is less than or equal to a predetermined value, such as 100, then it is converted to a HIGH signal; otherwise, it is a LOW signal. The predetermined value is set according to requirements of different OUTs 11. A combination of HIGH and LOW signals constitute a binary image in the form of binary pulses.

Figure 6:
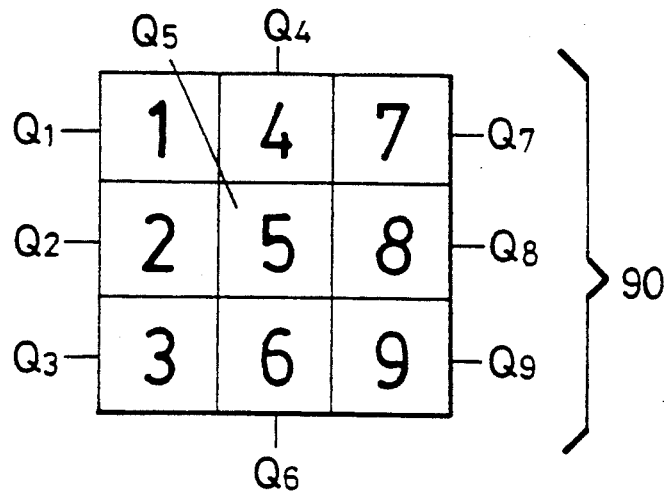
FIG. 6 is a Boolean expression for determining whether an area unit has a valid defect.
Figure 6A:
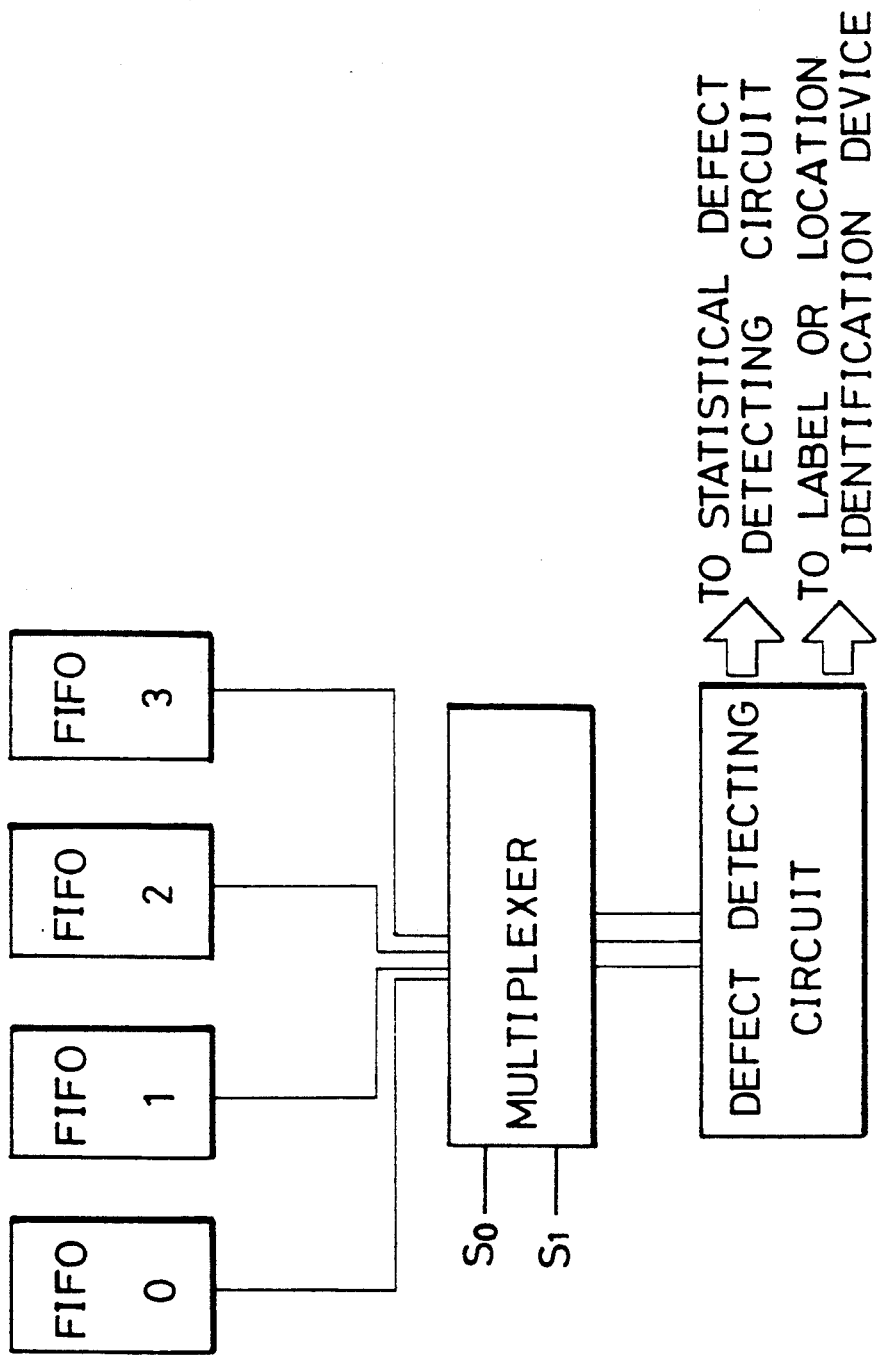
FIG. 6A is a schematic view of four FIFOs connected through a multiplexer to a defect-detecting circuit of the present invention.

The train of binary pulses is stored in the image-storing circuit 6 which comprises four first-in-first-out (FIFO) high-speed memories for storing the binary image. In practice, one of the four FIFOs receives the binary image corresponding to a scanning line, while the other three FIFOs pass a binary image corresponding to three scanning lines already stored therein to the defect detecting unit 70 and to the defect detecting statistical unit 13. Each time this occurs, one of the four FIFOs is used to receive a line of scanning image alternately. The schematic view of the FIFOs incorporated with the defect detecting unit 70 is shown in FIG. 6A.

The defect detecting unit 70 comprises the defect determining circuit 7 and the statistic defect-detecting circuit 8. The defect-detecting circuit 7 processes binary data by checking a plurality of data units continuously. Each data unit corresponds to an area unit 90 which is composed of 3×3 matrix pixels as shown in FIG. 6. In this area unit 90, if the Boolean expression equals "1" (i.e., HIGH), the area is deemed as a "valid defect"; if some of the pixels are in a HIGH status but the Boolean expression equals "0" (i.e., LOW), the area is deemed as a "small defect"; if none of the pixels is in a HIGH status, the area unit is deemed "defectless." The Boolean expression may be changed according to different requirements of defect detecting. For example, one available Boolean expression for a valid defect is described as follows:

$$\text{valid defect} = Q_3Q_2Q_1 + Q_4Q_3Q_2 + Q_5Q_3Q_1 + Q_6Q_2Q_1 + \\ Q_7Q_4Q_1 + Q_7Q_4Q_2 + Q_7Q_5Q_1 + Q_7Q_5Q_3 + \\ Q_8Q_4Q_1 + Q_2Q_5Q_7 + Q_3Q_5Q_4 + Q_9Q_5Q_1 + \\ Q_2Q_4Q_8 + Q_1Q_5Q_8 + Q_2Q_4Q_6 + Q_1Q_5Q_6.$$

$Q_1$ to $Q_9$ represents one bit of binary digital data, respectively, each of which corresponds to a pixel in the original scanning line. Moreover, "$Q_1$, $Q_4$, $Q_7$" represents three bits of binary digital data corresponding to three adjacent pixels in a first scanning line and is stored in a first FIFO; "$Q_2$, $Q_5$, $Q_8$," a second scanning line and a second FIFO; "$Q_3$, $Q_6$, $Q_9$," a third scanning line and a third FIFO. While the first, second, and third FIFOs are passing binary data to the defect-detecting circuit 7, a fourth FIFO is used for receiving a binary image corresponding a scanning line from the image-signal processing circuit 5. The first, second, third, and fourth FIFOs are not definitely numbered but changed alternately as described above.

The Boolean expression is realized by the defect-detecting circuit 7 which comprises a plurality of AND gates and OR gates. The technique for realizing the Boolean expression as described above to a real circuit (i.e., the defects detecting circuit 7) simply utilizes a combination of AND gates and OR gates, which is well known and not limited to a specific structure.

Figure 6B:
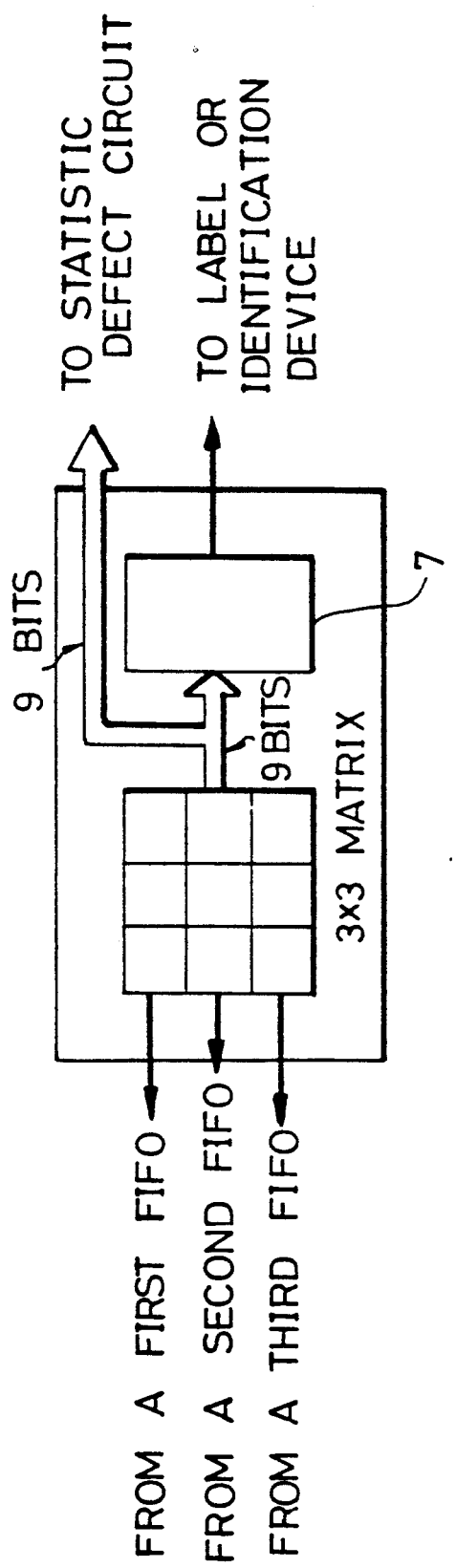
FIG. 6B is a schematic view of the defect-detecting circuit connected to two peripheral devices.

Referring to FIG. 6B, if a valid defect is detected, the defect-detecting circuit 7 will either actuate a label device to label the position of the valid defect or actuate a location identification device to store the defect location. The label device and the location identification device are peripheral devices which may be used to incorporate with the real-time apparatus of the present invention and are not included in the scope thereof.

Referring to FIG. 2 again, the statistical defect-detecting circuit 8 detects small defects which pass undetectedly in defect-detecting circuit 7 in an area unit 90 (see FIG. 6) but together are still counted as defects if the amount of the small defects in a predetermined area, such as an area equals to 30 scanning lines, exceeds a predetermined value (for example, 10 small defects).

Figure 7:
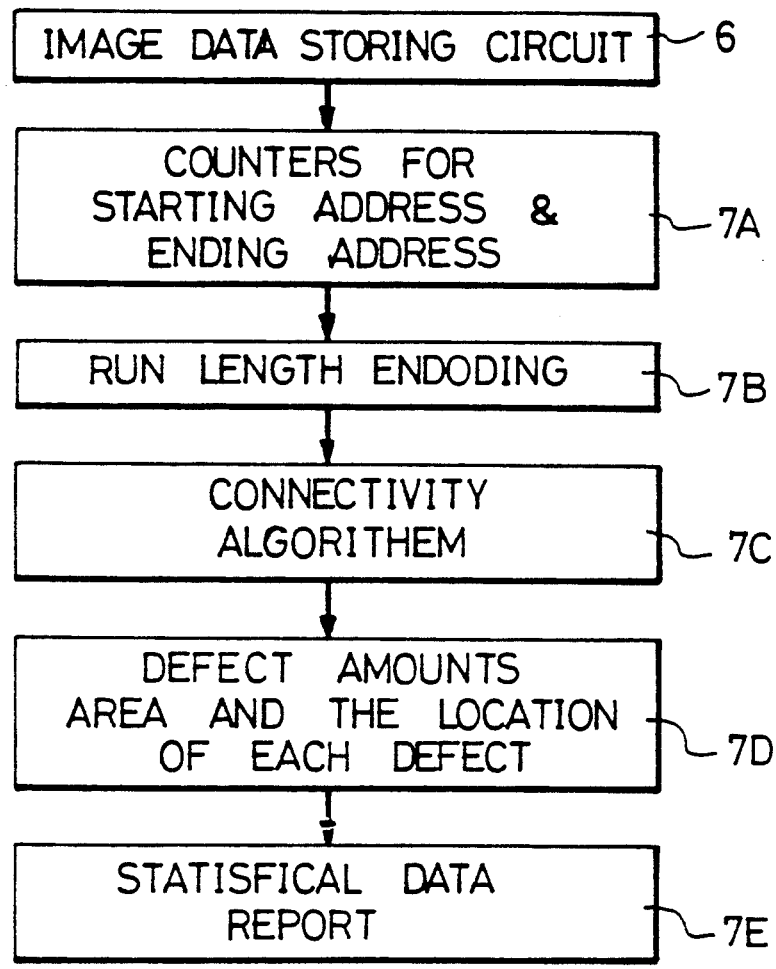
FIG. 7 is a block diagram of a defect-detecting statistic unit in the invention.

The defect detecting statistic unit 13, as shown in FIG. 2, is connected to the image-storing circuit 6 for calculating the amount of defects and the area and location of each defect by a well-known connectivity analyzation process. Referring to FIG. 7, is a block diagram of the defect detecting satatistic unit 13 is shown. The first block 6 represents obtaining data from the image data storing circuit 6. The procedure goes to block 7A. In block 7A a plurality of hardware counters calculates the starting address and ending address of each area unit 90 (see FIG. 6), and the procedure goes to block 7B. Blocks 7B to 7E are all software blocks. In block 7B, the run-length for the moving OUT 11 is calculated and encoded to a plurality of analyzed data which are sent to block 7C. The analyzed data are processed through a set of connectivity algorithm 7C and obtains the amount of defects, each area and location of corresponding defect, in block 7D. The procedure goes to block 7E, and has a statistical data report thereof.

The driving circuit 4 of the linear CCD camera 1 comprises a system-clock selecting circuit 40 and an exposure-time control circuit 41. The system-clock selecting circuit 40 is used to select a clock pulse of up to 20 MHz. The frequency of the clock pulse is selected according to the moving speed of the OUT 11. If the system clock has a high frequency (above 5 MHz), a sensor (not shown) in the CCD camera 1 is ON all the time since the defect detecting is proceeding, while a low frequency (less than 5 MHz) renders the CCD camera 1 ON for a first time-period and OFF for a second time-period alternately. The lengths of the first time-period and the second time-period are determined by the frequency of the clock pulse, which is not in the scope of the present invention. The exposure-time control circuit 41 is used for selecting a complete exposure mode or a half exposure mode. In the complete exposure mode the linear CCD camera 1 works with high frequency (such as 6 MHz) and the sensor of the CCD camera 1 is ON during the entire defect detecting operation. In the half exposure mode, the linear CCD camera 1 works with low frequency (such as 2 MHz) and the sensor is ON for a first time-period and OFF for a second time-period alternately.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A real-time apparatus for detecting surface defects on an object under test (OUT) comprising:

a high-frequency (at least 25 KHz) linear light source for generating a linear light to be focused on the surface of a moving OUT;

a linear charge coupled device (CCD) camera for scanning the moving OUT line-by-line and generating a corresponding image signal;

a driving circuit for controlling said linear CCD camera to couple said image signal generated thereby to an image-signal processing circuit;

said image-signal processing circuit coupling with said image signal from said linear CCD camera, compensating said image signal to a compensated signal, digitalizing said compensated signal to a train of digital signals, and determining which said digitalized signals are a HIGH or a LOW signal according to a predetermined gray-scale value; a combination of said HIGH and LOW signals constituting binary image data in the form of a train of binary pulses;

an image-storing circuit connected to said image-signal processing circuit for storing said binary image data;

a defect-detecting unit connected to said image-storing circuit for detecting whether an area unit is a valid defect, a small defect, or defectless, wherein said valid defect is defined by meeting at least one of a plurality of predetermined defect patterns, said small defect represents defects not meeting said predetermined defect patterns, and said defectless represents no defect at all; and a defect-detecting statistic unit being connected to said image-data storing means for calculating a total amount of defects, and an area and location of each defect by a well-known connectivity analyzation process.

2. The real-time apparatus for detecting surface defects on an OUT as claimed in claim 1, wherein said high-frequency linear light source comprises two fluorescent lighting tubes, each secured by a semicircular light shield respectively, which in turn, supported by a pair of supporting means on longitudinal sides thereof, two hinges being connected between said light shields for maintaining a constant gap therebetween, said constant gap being used as a channel for the light reflected from the surface of OUT to said linear CCD camera, One light shield being engaged to said pair of supporting means with a pair of secured points thereon, two knobs being fixed to two longitudinal ends of the other light shield, with two guiding grooves formed on each supporting means, respectively, such that a user may adjust a focusing angle of said light source by lifting up or pulling down said knobs along said guiding grooves, and "lock" said knobs when said focusing angle has been adjusted.

3. The real-time apparatus for detecting surface defects on a moving OUT as claimed in claim 1, wherein said image-signal processing circuit comprising:

an illumination compensation circuit for solving deviation problem in a linear light, compensating distortion part in each scanning line of image signal;

a clamp circuit for holding the image signal level to prevent distortion from a dark current;

an amplifier circuit for amplifying the image signal to a level which is acceptable by an analog-to-digital converter;

an analog-to-digital converter for converting said image signal to a 256-level digitalized gray scale signal;

a latch circuit for holding said digital signal; and a binary circuit for determining a digitalized signal to be either a HIGH signal or a LOW signal by comparing the gray scale level of each digitalized signal with a predetermined value such that said digital signal is converted to a HIGH signal when the gray scale level of each digitalized signal is less than or equal to said predetermined value, otherwise a LOW signal;

4. The real-time apparatus for detecting surface defect on a moving OUT as claimed in claim 1, wherein said defect detecting unit comprises:

a defect detecting circuit for determining a valid defect by checking a 3×3 matrix pixels, such that valid defect is determined when said 3×3 matrix pixels having pixels in HIGH status meeting with at least one of a plurality of predetermined patterns which are expressed by a Boolean expression; and a statistic defect detecting circuit for detecting statistic defects which pass in said defect-detecting circuit in an area unit but together are still counted as defects if the amounts of the small defects in a predetermined area exceeds an predetermined value;

5. The real-time apparatus for detecting surface defect on a moving OUT as claimed in claim 1, wherein said image data storing circuit comprises four first-in-first-out (FIFO) memories, each of which-receives a binary image corresponding to a scanning line, while the other three FIFOs pass binary image corresponding to three scanning lines already stored therein to said defect detecting unit alternatively.

* * * * *